United States Patent
Wu

(10) Patent No.: US 11,315,268 B2
(45) Date of Patent: Apr. 26, 2022

(54) IMAGE PROCESSING METHODS, IMAGE PROCESSING APPARATUSES AND ELECTRONIC DEVICES

(71) Applicant: GUANGDONG OPPO MOBILE TELECOMMUNICATIONS CORP., LTD., Guangdong (CN)

(72) Inventor: Anping Wu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 145 days.

(21) Appl. No.: 16/856,526

(22) Filed: Apr. 23, 2020

(65) Prior Publication Data

US 2020/0250844 A1 Aug. 6, 2020

Related U.S. Application Data

(63) Continuation of application No. PCT/CN2018/112156, filed on Oct. 26, 2018.

(30) Foreign Application Priority Data

Oct. 27, 2017 (CN) .......................... 201711020139.2
Oct. 27, 2017 (CN) .......................... 201711021392.X
Oct. 27, 2017 (CN) .......................... 201711022955.7

(51) Int. Cl.
*G06T 7/521* (2017.01)
*G06F 21/32* (2013.01)
(Continued)

(52) U.S. Cl.
CPC .............. *G06T 7/521* (2017.01); *G06F 21/32* (2013.01); *H04N 5/2256* (2013.01); *H04N 5/23219* (2013.01)

(58) Field of Classification Search
CPC ....... G06T 7/521; G06F 21/32; H04N 5/2256; H04N 5/23219; H04N 5/23229; G06K 9/00255; G03B 17/54; G03B 15/02
See application file for complete search history.

(56) References Cited

U.S. PATENT DOCUMENTS

2005/0231628 A1* 10/2005 Kawaguchi ...... H04N 5/232945
348/345
2011/0122288 A1 5/2011 Kawanami
(Continued)

FOREIGN PATENT DOCUMENTS

CN 101226587 A 7/2008
CN 101241594 A 8/2008
(Continued)

OTHER PUBLICATIONS

Indian Examination Report for IN Application 202017021453 dated Jul. 20, 2021. (6 pages).
(Continued)

*Primary Examiner* — John B Strege
(74) *Attorney, Agent, or Firm* — Young Basile Hanlon & MacFarlane, P.C.

(57) ABSTRACT

The present disclosure relates to an image processing method, an image processing apparatus, and an electronic device. The method includes projecting structured light to a current user based on a preset rule; capturing a structured-light image modulated by the current user each time; and superposing the structured-light images to acquire a target image.

18 Claims, 9 Drawing Sheets

(51) Int. Cl.
    *H04N 5/225*     (2006.01)
    *H04N 5/232*     (2006.01)

(56) References Cited

U.S. PATENT DOCUMENTS

| | | |
|---|---|---|
| 2013/0128102 A1 | 5/2013 | Yano |
| 2015/0022693 A1 | 1/2015 | Appia et al. |
| 2015/0339471 A1 | 11/2015 | Bennett et al. |
| 2016/0366397 A1 | 12/2016 | Lee et al. |
| 2018/0188021 A1* | 7/2018 | Wagner .............. G01B 11/2513 |

FOREIGN PATENT DOCUMENTS

| | | |
|---|---|---|
| CN | 102074045 A | 5/2011 |
| CN | 101377901 B | 10/2011 |
| CN | 102221553 A | 10/2011 |
| CN | 102760234 A | 10/2012 |
| CN | 102780845 A | 11/2012 |
| CN | 203164866 U | 8/2013 |
| CN | 103810463 A | 5/2014 |
| CN | 103838371 A | 6/2014 |
| CN | 102878950 B | 3/2015 |
| CN | 103207449 B | 4/2015 |
| CN | 104639843 A | 5/2015 |
| CN | 104769387 A | 7/2015 |
| CN | 106131405 A | 11/2016 |
| CN | 106454287 A | 2/2017 |
| CN | 106572340 A | 4/2017 |
| CN | 106796107 A | 5/2017 |
| CN | 106900039 A | 6/2017 |
| CN | 106990112 A | 7/2017 |
| CN | 107229925 A | 10/2017 |
| CN | 206584368 U | 10/2017 |
| CN | 107800962 A | 3/2018 |
| CN | 107800963 A | 3/2018 |
| CN | 107820005 A | 3/2018 |
| EP | 2500687 A3 | 2/2013 |
| JP | 2015161776 A | 9/2015 |
| WO | 2017005726 A1 | 1/2017 |

OTHER PUBLICATIONS

Office Action with English Translation for CN application 201911101745.6 dated Nov. 11, 2020.
Extended European Search Report for EP application 18871067.7 dated Sep. 21, 2020.
OA for CN application 201711021392.X with translation.
OA for CN application 201711020139.2 with translation.
OA for CN application 201711022955.7 with translation.
ISR for PCT application PCT/CN2018/112156 with translation.

* cited by examiner

FIG. 3

IMAGE PROCESSING METHODS, IMAGE PROCESSING APPARATUSES AND ELECTRONIC DEVICES

CROSS-REFERENCE TO RELATED APPLICATION(S)

This application is a continuation application of International Patent Application No. PCT/CN2018/112156, filed on Oct. 26, 2018, which claims priority to Chinese Patent Application Nos. 201711022955.7, 201711020139.2, and 201711021392.X, all filed on Oct. 27, 2017, the disclosure of all of which are hereby incorporated by reference in their entireties.

TECHNICAL FIELD

The present disclosure relates to the field of mobile terminal technologies, and more particularly to an image processing method, an image processing apparatus, and an electronic device.

BACKGROUND

With the development of mobile terminal technologies, structured-light technologies are gradually applied to the mobile terminals. However, the existing mobile terminal adopting the structured light technology has a large instantaneous power consumption and an obvious heating phenomenon.

SUMMARY

The image processing method of the embodiment of the disclosure includes: projecting structured light to a current user based on a preset rule; capturing a structured-light image modulated by the current user each time; and superposing the structured-light images to acquire a target image.

The image processing apparatus of the embodiment of the disclosure includes: a structured-light emitter, configured to emit structured light to a current user; an image collector, configured to capture a structured-light image modulated by the current user; and a processor, configured to: control the structured-light emitter to project the structured light to the current user based on a preset rule; and control the image acquirer to capture the structured-light image modulated by the current user each time and superpose the structured-light images to acquire a target image.

The electronic device of the embodiment of the disclosure includes: one or more processors, a memory, and one or more programs. The one or more programs are stored in the memory and configured to be executed by the one or more processors. The one or more programs include instructions for executing the image processing method described in the above embodiment.

Additional aspects and advantages of the disclosure will be given in part in the following descriptions, become apparent in part from the following descriptions, or be learned from the practice of the disclosure.

BRIEF DESCRIPTION OF DRAWINGS

The foregoing and/or additional aspects and advantages of the disclosure will become apparent and more readily from the following descriptions made with reference to the drawings, in which:

FIG. 3 is a schematic diagram I illustrating a light source array composed of uniformly-arranged light source lattices;

DETAILED DESCRIPTION

Figure 1:
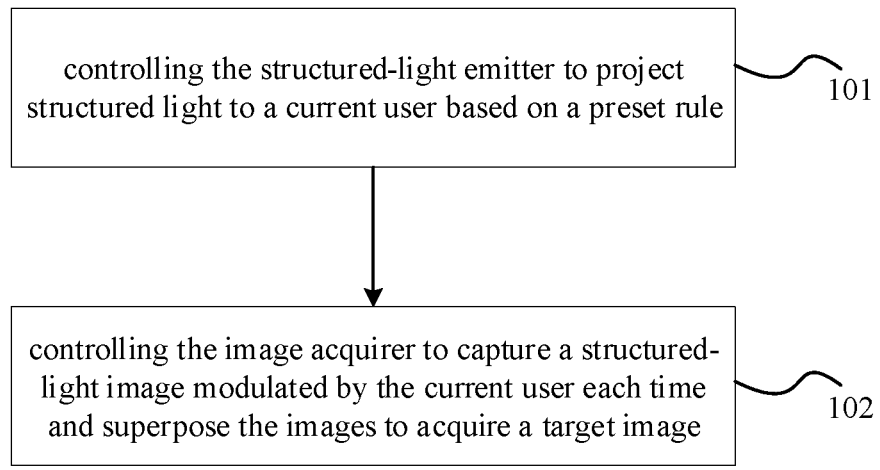
FIG. 1 is a flowchart of an image processing method according to an embodiment of the disclosure.

Reference will be made in detail to the embodiments of the disclosure, examples of which are illustrated in the accompanying drawings, in which the same or similar elements and the elements having same or similar functions are denoted by like reference numerals throughout the descriptions. The embodiments described below with reference to the drawings are examples and are intended to explain the disclosure and shall not be construed to limit the present disclosure.

An image processing method, an image processing apparatus, and an electronic device provided in the embodiments of the disclosure, are described below with reference to the drawings.

FIG. 1 is a flowchart of an image processing method according to an embodiment of the disclosure. The method may be applicable to an electronic device. The electronic device may be a mobile terminal such as a mobile phone and a tablet computer. The electronic device may include a structured-light emitter and an image acquirer. The structured-light emitter is configured to project structured light to a captured object. The image acquirer is configured to capture a structured-light image modulated by the captured object.

As illustrated in FIG. 1, the image processing method includes the following.

At block 101, the structured-light emitter is controlled to project structured light to a current user based on a preset rule.

Presently, with the development of mobile terminal technologies, the mobile terminal may have increasingly abundant functions. Furthermore, the face recognition function gradually becomes a standard configuration for the mobile terminal. For example, increasing mobile terminals support face unlocking, face payment, etc. When a user utilizes a function related to carrying out face recognition, after the function is launch, the mobile terminal may call a built-in camera to carry out image acquisition so as to acquire an image containing a face.

In the embodiment, when the image acquirer in the electronic device is utilized for capturing, the structured-light emitter may be controlled to project the structured light to the current user based on the preset rule, so that the structured-light emitter may project a small amount of structured light to the current user each time.

The preset rule may be set in advance. For example, the preset rule may be that, a part of light source points in the structured-light emitter may be turned on in the order of rows or columns, or a part of light source points in the structured-light emitter may be turned on in a manner extending from the middle to the periphery.

At block 102, the image acquirer is controlled to capture a structured-light image modulated by the current user each time and superpose the images to acquire a target image.

In the embodiment, after the structured-light emitter projects the structured light to the current user, the structured light reaches the current user and changes due to the modulation of the current user. At this moment, the electronic device may control the image acquirer to capture the structured-light image modulated by the current user. After the structured-light emitter projects the structured light each time, the image acquirer may capture the corresponding structured-light image, and superpose the acquired structured-light images to acquire the target image.

It is to be explained herein that the implementation of controlling the image acquirer to capture the structured-light image modulated by the current user each time and superpose the images to acquire the target image will be given in the following, and it will not be described in detail herein in order to avoid redundancy.

With the image processing method of the embodiment of the disclosure, the structured-light emitter is controlled to project the structured light to the current user based on the preset rule, and the image acquirer is controlled to capture the structured-light image modulated by the current user each time and superpose the images to acquire the target image. Therefore, the structured-light emitter is controlled to project a small amount of structured light each time based on the set rule during capturing, effectively reducing the instantaneous power consumption during capturing, facilitating heat dissipation, avoiding the obvious heating phenomenon on the mobile terminal, and solving the technical problem that the instantaneous power consumption of the mobile terminal is large because all light source points are turned on to project the structured light in the related art. Furthermore, all light source points may be covered through multiple times of projection, making the imaging of the captured object complete, and ensuing the imaging quality.

Figure 2:
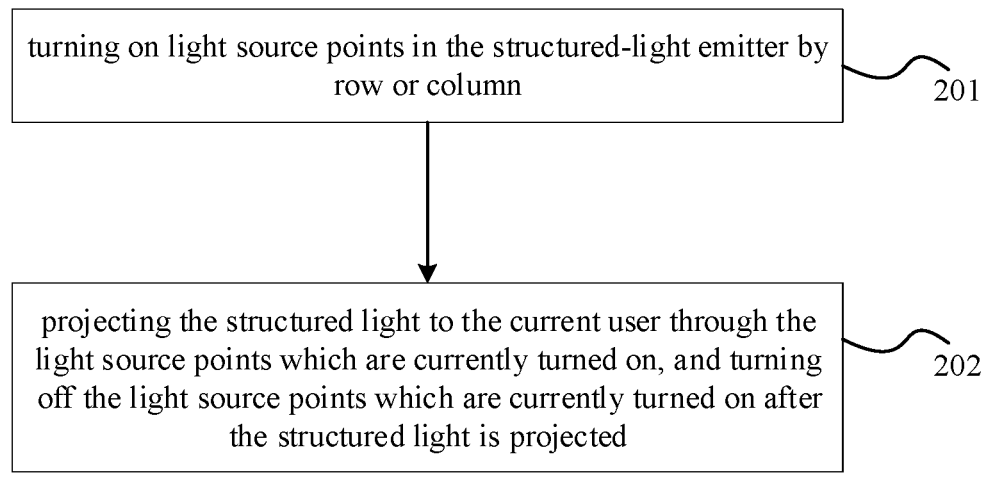
FIG. 2 is a flowchart of an image processing method according to an embodiment of the disclosure.

To more clearly describe the implementation process of controlling the structured-light emitter to project the structured light to the current user based on the preset rule in the previous embodiment, another image processing method is proposed in the embodiment of the disclosure. FIG. 2 is a flowchart of an image processing method according to an embodiment of the disclosure.

As illustrated in FIG. 2, on the basis of the embodiment illustrated in FIG. 1, the act at block 101 may include the following.

At block 201, light source points in the structured-light emitter are turned on by row or column.

In the embodiment, when the image acquirer in the electronic device is utilized to capture, the electronic device may firstly turn on light source points of a light source array in the structured-light emitter based on a certain order. For example, the light source points may be turned on based on an order of rows or an order of columns of the light source array. Optionally, in the embodiment, the arrangement of the light source points in the light source array may be uniform so as to turn on/off the light source points sequentially.

Figure 3:
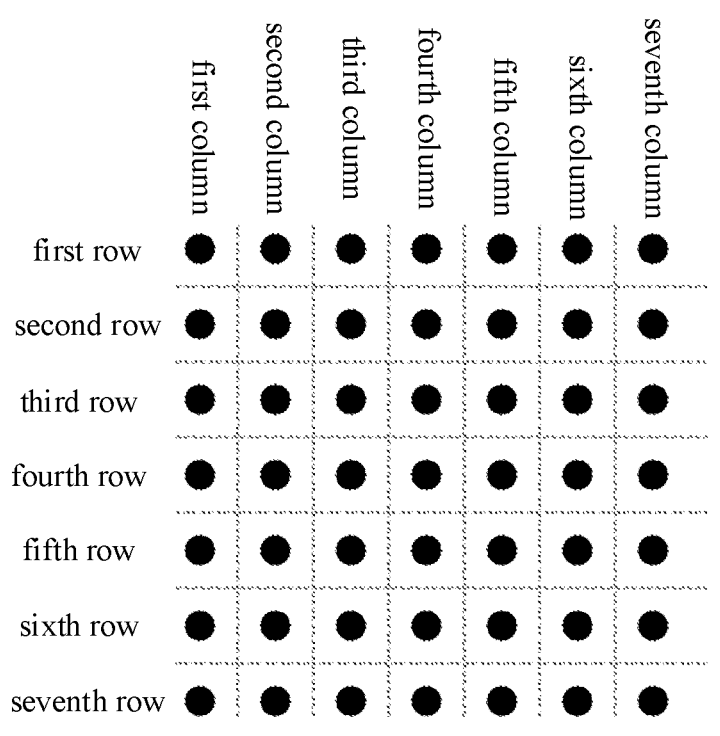

FIG. 3 is a schematic diagram I illustrating a light source array composed of uniformly-arranged light source lattices. For convenience of understanding, the light source array illustrated in FIG. 3 will be explained as an example. A light source array composed of 7*7 light source points is illustrated in FIG. 3. It is assumed that each column in the light source array is numbered in the order from left to right, namely, a first column, a second column, . . . , and a seventh column; each row in the light source array is numbered in the order from top to bottom, namely, a first row, a second row, . . . , and a seventh row, as illustrated in FIG. 3.

As a possible implementation, when the electronic device controls the light source points in the structured-light emitter to be turned on, each row of light source points in the structured-light emitter may be turned on row by row starting from the first row or the last row; alternatively, each column of light source points in the structured-light emitter may be turned on column by column starting from the first column or the last column. For example, for the light source array illustrated in FIG. 3, the first row of light source points, the second row of light source points, . . . , and the seventh row of light source points may be sequentially turned on in an order from top to bottom; alternatively, the seventh column of light source points, the sixth column of light source points, . . . , and the first column of light source points may be sequentially turned on in an order from right to left.

As a possible implementation, when the electronic device controls the light source points in the structured-light emitter to be turned on, each row of light source points in the structured-light emitter may be turned on alternately from a designated row to both sides of the designated row, or each column of light source points in the structured-light emitter may be turned on alternately from a designated column to both sides of the designated column. For example, for the light source array illustrated in FIG. 3, the fourth row, the fifth row, the third row and the like may be sequentially turned on from the fourth row towards the corresponding upper side and the corresponding lower side. When the light source points are turned on, the light source points on the upper side and the lower side are alternately turned on by taking the light source points on the fourth row as a dividing line. Alternatively, the fourth row of light source points may be turned on for the first time, then the two rows of light source points symmetrical on the upper and lower sides with the fourth row as a symmetry axis may be turned on each time, that is, the third row of light source points and the fifth row of light source points may be turned on for the second time, the second row of light source points and the sixth row of light source points may be turned on for the third time, and the like.

It will be appreciated that in practice, the light source array may include light source points with the type of circular speckles, cross speckles, etc., and that the size of the light source array is much larger than the size of the light source array illustrated in FIG. 3. The light source array illustrated in FIG. 3 is an example and not a limitation of the disclosure.

Further, in practice, to avoid a case that it may take a long period of time for the capturing process when one row or one column of light source points is controlled to be turned on each time, multiple rows or columns of light source points may be turned on each time to reduce the period of time for capturing when the light source points in the structured-light emitter are turned on by row or column.

At block 202, the structured light is projected to the current user through the light source points which are currently turned on, and the light source points which are currently turned on are turned off after the structured light is projected.

When the light source points are turned on each time, the structured light may be projected to the current user through the light source points which are currently turned on, and after the light source points which are currently turned on project the structured light, the current light source points are turned off.

With the image processing method of the embodiment, the light source points in the structured-light emitter may be turned on by row or column, the structured light may be projected to the current user by using the light source points which are currently turned on, and the light source points which are currently turned on may be turned off after the structured light is projected. Therefore, the structured-light emitter may be controlled to project less structured light each time during capturing and project for multiple times, effectively reducing the instantaneous power consumption during capturing, facilitating heat dissipation, and avoiding the obvious heating phenomenon of the mobile terminal.

Figure 4:
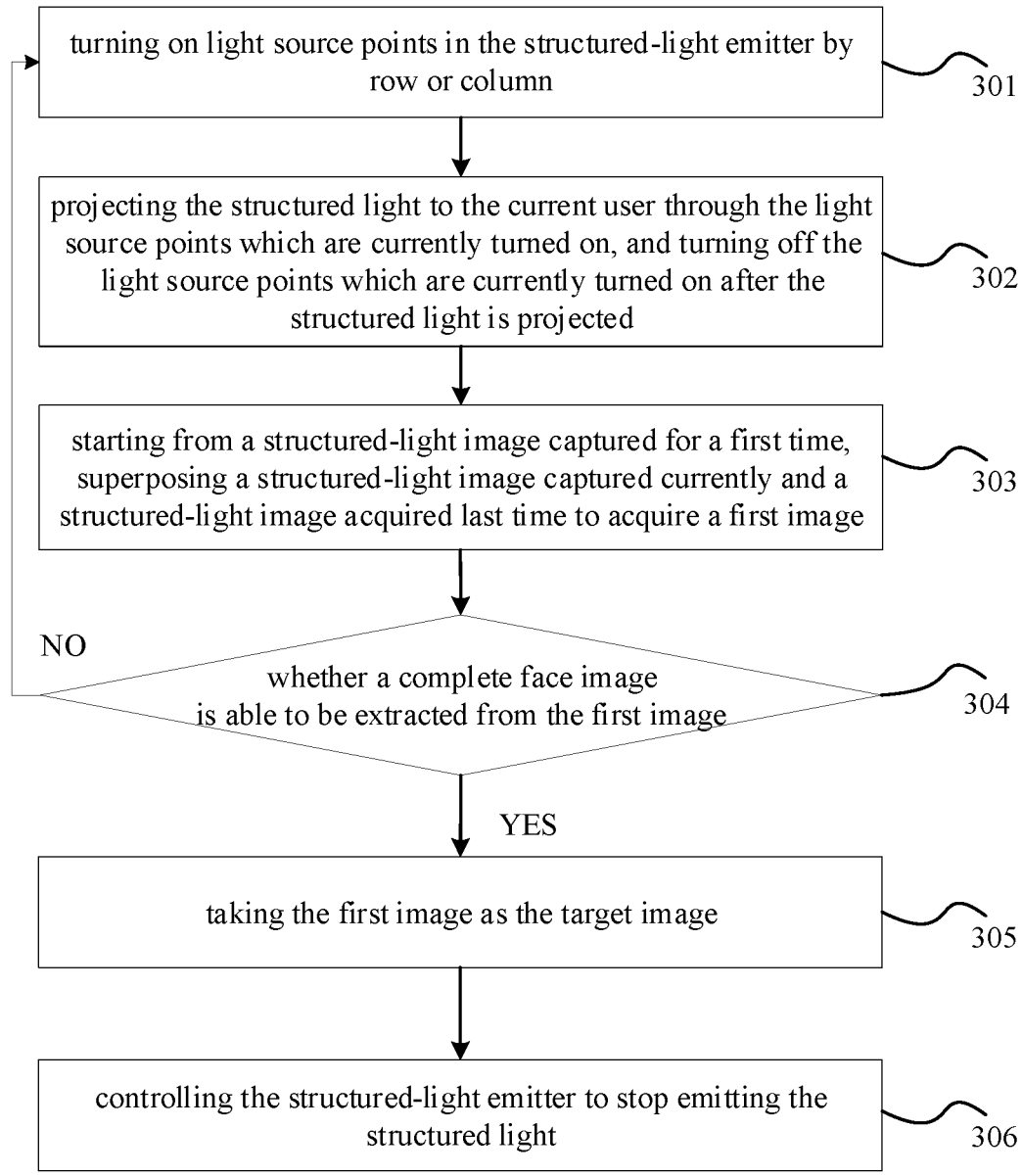
FIG. 4 is a flowchart of an image processing method according to an embodiment of the disclosure.

To more clearly illustrate the implementation process of controlling the image acquirer to capture the structured-light image modulated by the current user each time and superpose the images to acquire the target image in the above-mentioned embodiment, the embodiment of the disclosure provides another image processing method. FIG. 4 is a flowchart of an image processing method provided by the embodiment of the disclosure.

As illustrated in FIG. 4, the image processing method may include the following.

At block 301, light source points in the structured-light emitter are turned on by row or column.

At block 302, the structured light is projected to the current user through the light source points which are currently turned on, and the light source points which are currently turned on are turned off after the structured light is projected.

It should be noted that the description of blocks 301-302 in the present embodiment may be made with reference to the description of blocks 201-202 in the previous embodiment, the implementation principles of which are similar and will not be described in detail herein.

At block 303, starting from a structured-light image captured for a first time, a structured-light image captured currently is superposed with a structured-light image acquired last time to acquire a first image.

In the capturing process, the light source points may be turned on for the first time, and after the light source points project the structured light, the image acquirer captures to acquire a first structured-light image. Since the current capturing is the first capturing, and no previous structured-light image may be superposed with the first structured-light image, the first structured-light image may be used as the first image acquired after the first capturing. After the light source points are turned on for the second time and the structured light is projected by the light source points, the image acquirer captures to acquire a second structured-light image, the second structured-light image and the first structured-light image are subjected to image superposition, the superposed structured-light image is acquired, and the superposed structured-light image is taken as the first image.

After the light source points are turned on for the third time and the structured light is projected by the light source points, the image acquirer captures to acquire a third structured-light image, the currently-captured third structured-light image and the superposed structured-light image acquired after the second capturing are subjected to image superposition, and the superposed structured-light image is acquired and used as the first image. That is, in the first image acquired after the third capturing, the first structured-light image, the second structured-light image, and the third structured-light image are included.

In summary, in the present embodiment, in addition to the structured-light image acquired by turning on the light source points for capturing at the first time, the structured-light image acquired by the current capturing and the structured-light image acquired by each preceding capturing are included in the first image acquired in the subsequent capturing process.

At block 304, it is determined whether a complete face image is able to be extracted from the first image.

In the embodiment, for the light source points turned on each time, the structured light is projected to the current user through the light source points which are currently turned on, and after the current capturing is completed and the first image is acquired, it is further determined whether the complete face image can be extracted from the acquired first image.

In detail, when determining, a second image including facial features may be first extracted from the first image. The facial features may include eyebrows, eyes, nose, mouth, ears, etc. The extracted second image is matched with one or more authorized face images stored on the electronic device. The one or more authorized face images may be one or more images, which may be multiple different images of one authorized user, and also be multiple images of multiple different authorized users. The one or more authorized face images may be stored in a memory of the electronic device in advance. In detail, when the second image is matched with the one or more authorized face images, features of facial organs may be extracted from the second image, and the extracted features of facial organs are compared with features of facial organs in the one or more authorized face images. When the extracted features of each facial organ are consistent with features of a corresponding facial organ in one of the one or more authorized face images, the one of the one or more authorized face images is then used as the target authorized face image. Then, if the authorized face image is matched, it is determined that the complete face image may be extracted from the first image, and the act at block 305 is performed; and if the matching does not pass, it is returned to the act at block 301, light source points of a next row or a next column are turned on to project the structured light to the current user, to further acquire the structured-light image.

Further, in one possible implementation of an embodiment of the disclosure, the electronic device may also be unlocked after the authorized face image is matched when the electronic device is currently in a locked state.

When the second image is matched and recognized with the one or more authorized face images, there are two cases, one is that the second image is incomplete and another is that the second image is complete but not the face image of the authorized user. Therefore, in one possible implementation of the embodiment of the disclosure, after the second image is extracted from the first image, it is determined whether the facial features of the second image is complete firstly, and if not, it is returned to the act at block 301; if it is complete, the act at block 306 is performed and the extracted second image is matched with the one or more authorized face images stored on the electronic device, and after the matching has passed, the act at block 305 is performed.

At block 305, the first image is taken as the target image.

In the embodiment, when the authorized face image is matched, it is determined that the complete face image is extracted from the first image, and the first image is taken as the target image.

At block 306, the structured-light emitter is controlled to stop emitting the structured light.

To further reduce the power consumption of the electronic device, in the present embodiment, the electronic device may control the structured-light emitter to stop emitting the structured light after determining that the complete face image is extracted from the first image.

With the image processing method provided in the embodiment of the disclosure, the light source points are sequentially turned on according to the order of rows or columns in the capturing process, so that the structured-light emitter may be controlled to project less structured light each time and project multiple times. Therefore, the instantaneous power consumption during capturing may be effectively reduced, the heat dissipation is facilitated, and the obvious heating phenomenon on the mobile terminal is avoided. Through superposing images captured each time to acquire the first image, determining whether the complete face image is able to be extracted from the first image, taking the first image as the target image when the complete face image is extracted, and controlling the structured-light emitter to stop emitting the structured light, the times of projecting the structured light may be reduced, and the power consumption of the electronic device may be reduced.

Figure 5:
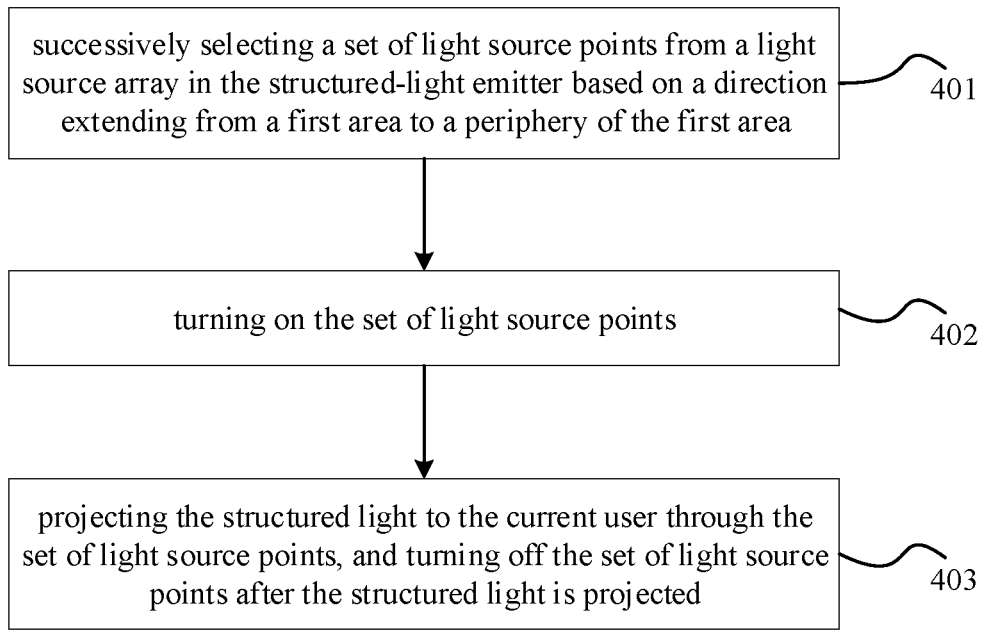
FIG. 5 is a flowchart of an image processing method according to an embodiment of the disclosure.

In order to more clearly describe the implementation process of controlling the structured-light emitter to project the structured light to the current user based on the preset rule in the previous embodiment, another image processing method is proposed in the embodiment of the disclosure. FIG. 5 is a flowchart of an image processing method proposed in the embodiment of the disclosure.

As illustrated in FIG. 5, on the basis of the embodiment illustrated in FIG. 1, the act at block 101 may include the following.

At block 401, a set of light source points is successively selected from a light source array in the structured-light emitter based on a direction extending from a first area to a periphery of the first area.

The first area is located at a central position of the light source array.

In actual capturing, the user generally likes to display the most critical portion of the captured object in the middle position of the image, that is, the middle position of the camera is generally aligned with the critical portion of the captured object in capturing. For example, the face image of the user is typically displayed in the middle of the screen of the mobile terminal while the user is self-capturing. Therefore, the camera may be controlled to preferentially capture the image of the most critical portion of the captured object when capturing, especially capturing the face image of the current user when utilizing functions such as face unlocking, face payment and the like.

Therefore, in the embodiment, the area located by the light source points contained in the central position of the light source array in the structured-light emitter may be set as the first area, and then the set of light source points is successively selected from the light source array in the structured-light emitter based on the direction extending from the first area to the periphery of the first area, starting from the first area.

Figure 6:
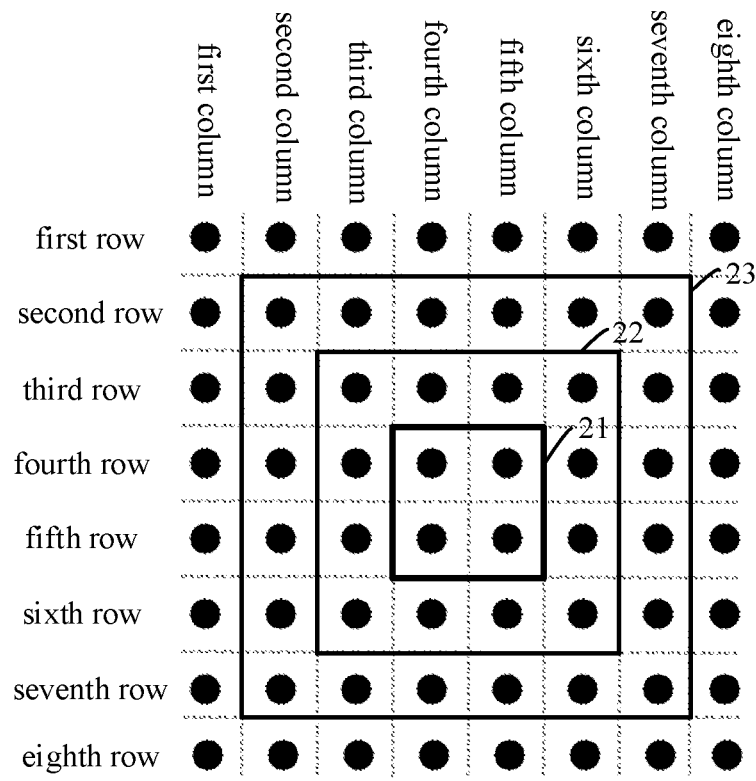
FIG. 6 is a schematic diagram II illustrating a light source array composed of uniformly-arranged light source lattices.

FIG. 6 is a schematic diagram II illustrating a light source array composed of uniformly-arranged light source lattices. To facilitate understanding, the light source array illustrated in FIG. 6 will be explained as an example. The light source array illustrated in FIG. 6 is composed of 8*8 light source points. It is assumed that each column in the light source array is numbered in the order from left to right, namely, a first column, a second column, . . . , and an eighth column; and each row in the light source array is numbered in order from top to bottom, namely, a first row, a second row, . . . , and an eighth row, as illustrated in FIG. 6. It is further assumed that the area 21 illustrated in FIG. 6 is the first area, that is, the first area includes four light source points, two light source points of the fourth column and the fifth column in the fourth row, and two light source points of the fourth column and the fifth column in the fifth row.

It will be appreciated that in practice, the light source array may include light source points with the type of circular speckles, cross speckles, etc., and that the size of the light source array is much larger than the size of the light source array illustrated in FIG. 6. The light source array illustrated in FIG. 6 is an example and not a limitation of the disclosure.

As an example, when the set of light source points is selected, the set of light source points, selected each time, may all include the first area. Taking the light source array illustrated in FIG. 6 as an example, the set of light source points selected for the first time may be the light source points in the first area, namely the light source points in the area 21 in FIG. 6; the set of light source points selected for the second time includes the set of light source points selected for the first time, for example, the set of light source points selected for the second time may be a set of light source points included in the area 22 in FIG. 6; the set of light source points selected for the third time includes the set of light source points selected for the second time, for example, the set of light source points selected for the third time may be a set of light source points included in the area 23 in FIG. 6; and so on.

As another example, when the set of light source points is selected, the set of light source points, selected each time thereafter, does not include light source points within the first area, except that the set of light source points selected for the first time includes the first area. Still taking the light source array illustrated in FIG. 6 as an example, the set of light source points selected for the first time may be the light source points in the first area, namely the light source points in the area 21 in FIG. 6; the set of light source points selected for the second time does not include light source points in the set of light source points selected for the first time, for example, the set of light source points selected for the second time may be a set of light source points in an annular area between the area 21 and the area 22; the set of light source points selected for the third time does not include light source points in the sets of light source points selected for the first two times, for example, the set of light source points selected for the third time may be a set of light source points in an annular area between the area 22 and the area 23; and so on.

It should be noted here that the set of light source points selected for the first time may include not only the light source points in the first area, but also the light source points around the first area, e.g. the light source points in the area 22 in FIG. 6 may form the set of light source points selected for the first time. The foregoing examples are by way of example only and are not intended as limitations on the disclosure.

At block 402, the set of light source points is turned on.

In this embodiment, after the set of light source points is selected from the light source array of the structured-light emitter, the structured-light emitter may be controlled to turn on all light source points within the selected set of light source points.

At block 403, the structured light is projected to the current user through the set of light source points, and the set of light source points is turned off after the structured light is projected.

For the set of light source points turned on each time, the electronic device may control the structured-light emitter to project the structured light to the current user through the set of light source points which is currently turned on. After the structured-light emitter projects the structured light, the light source points in the set of light source points which is currently turned on are turned off.

With the image processing method of the embodiment, the set of light source points is successively selected from the light source array in the structured-light emitter based on the direction extending from the first area to the periphery of the first area. The set of light source points is turned on. The structured light is projected to the current user through the set of light source points, and the set of light source points is turned off after the structured light is projected. Since in the capturing process, the set of light source points is selected in a mode of extending from the middle to the periphery, and the light source points are turned on for capturing, the structured-light emitter may be controlled to project a small amount of structured light each time during capturing, and project for multiple times. Since the small amount of structured light is projected each time, the instantaneous power consumption during capturing may be effectively reduced, the heat dissipation may be facilitated, the obvious heating phenomenon on the mobile terminal may be avoided, and the technical problem of large instantaneous power consumption of the mobile terminal caused by turning on all light source points to project the structured light in the related art is solved. Furthermore, all light source points may be covered through multiple times of projection, making the imaging of the captured object complete, and ensuing the imaging quality.

Figure 7:
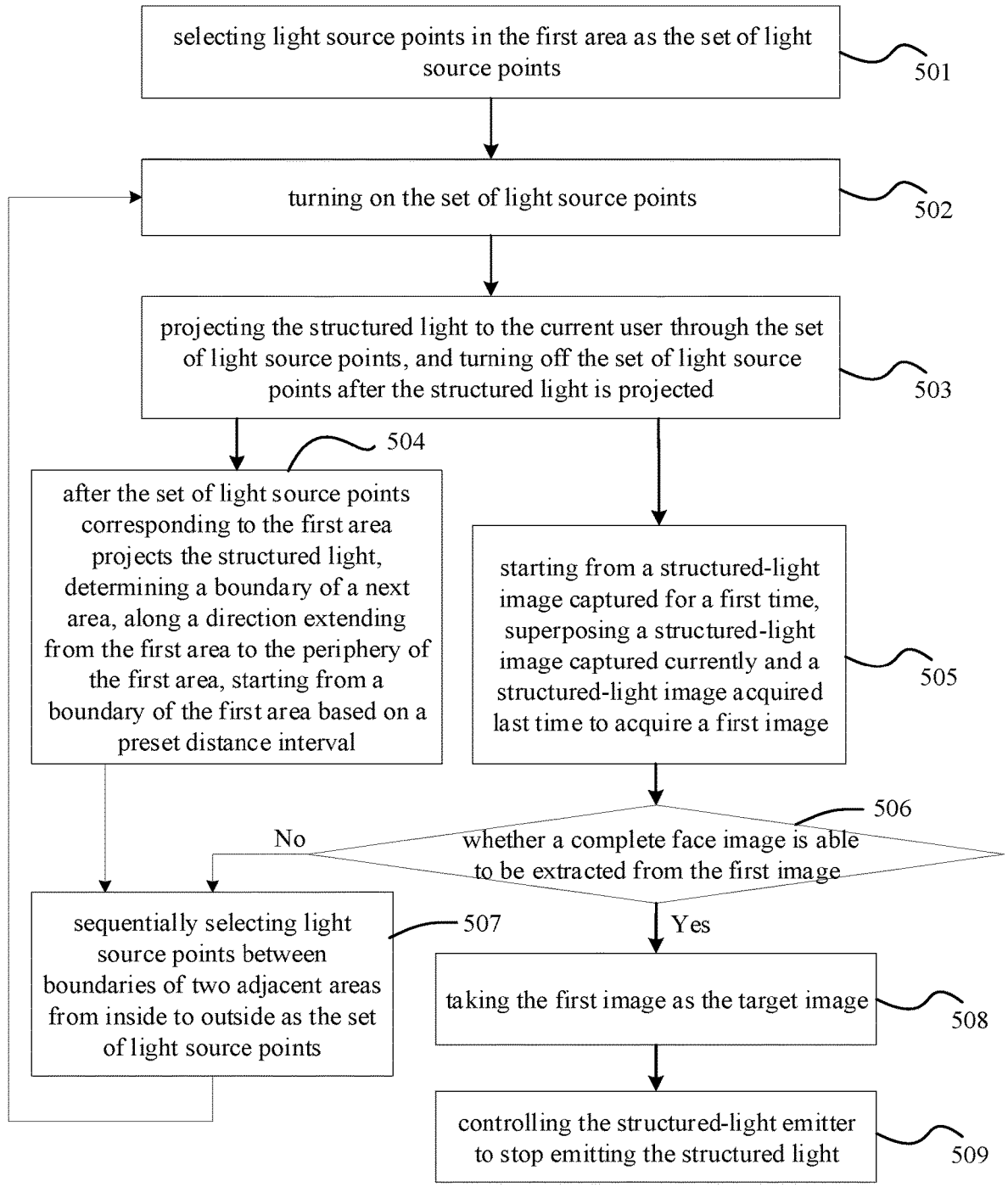
FIG. 7 is a flowchart of an image processing method according to an embodiment of the disclosure.

In order to more clearly illustrate the previous embodiment, another image processing method is proposed in the embodiment of the disclosure. FIG. 7 is a flowchart of an image processing method proposed in the embodiment of the disclosure.

As illustrated in FIG. 7, the image processing method may include the following.

At block 501, light source points in the first area are selected as the set of light source points.

Since the middle area of the camera is generally aligned with the critical portion of the captured object during capturing, the image acquirer may be controlled to capture the image of the critical portion firstly during capturing. Therefore, in the embodiment, when the structured-light image is captured, the light source points at the center position of the light source array in the structured-light emitter may be firstly controlled to project the structured light to the current user so as to preferentially acquire the structured-light image of the critical portion.

In the embodiment, the area located by the light source points at the central position of the light source array may be set in advance as the first area, and the light source points in the first area may be selected as the set of light source points during capturing. The size of the first area is not limited in the disclosure, for example, the area 21 in the light source array illustrated in FIG. 6 may serve as the first area, and the area 22 may also serve as the first area.

At block 502, the set of light source points is turned on.

At block 503, the structured light is projected to the current user through the set of light source points, and the set of light source points is turned off after the structured light is projected.

In the embodiment, after the set of light source points is selected each time, the electronic device may control to turn on the light source points in the selected set of light source points, and project the structured light to the current user through the turned-on set of light source points. After all the light source points in the turned-on set of light source points project the structured light, the electronic device controls the light source points in the set of light source points to be turned off.

At block 504, after the set of light source points corresponding to the first area projects structured light, a boundary of a next area is determined, along a direction extending from the first area to the periphery of the first area, starting from a boundary of the first area based on a preset distance interval.

For the set of light source points selected for the first time, after the set of light source points corresponding to the first area projects the structured light, when the image acquirer is controlled to capture the structured-light image modulated by the current user, the boundary of the next area may be determined along the direction extending from the first area to the periphery of the first area and starting from the boundary of the first area based on the preset distance.

The preset distance may be the interval of a preset number of light source points, for example, the distance between two light source points is taken as the preset distance, the distance between two light source points is taken as the preset distance, and the like.

Taking the light source array illustrated in FIG. 6 as an example, the set of light source points selected for the first time is the first area. After the light source points in the first area (area 21 in FIG. 6) project the structured light, the boundary of the next area may be determined by taking the interval between two adjacent light source points in the same row as the preset distance. At this time, the boundary of the next area after the first area may be determined as the boundary of the area 22. The boundary of the further next area is the boundary of area 23. Alternatively, the boundary of the next area may be determined by taking the interval between adjacent three light source points in the same row as the preset distance. At this time, the boundary of the next area after the first area may be determined to be the boundary of the area 23.

At block 505, starting from a structured-light image captured for a first time, a structured-light image captured currently and a structured-light image acquired last time are superposed to acquire a first image.

When the set of light source points is selected and turned on for the first time, after all the light source points in the set of light source points project the structured light, the electronic device controls the image acquirer to capture to acquire a first structured-light image. Since the current capturing is the first capturing and no previous structured-light image may be superposed with the first structured-light image, the first structured-light image may be used as the first image acquired after the first capturing.

When the set of light source points is selected for the second time and all the light source points in the set of light source points are turned on, after all the light source points in the set of light source points project the structured light, the electronic device controls the image acquirer to capture for the second time to acquire a second structured-light image, and the second structured-light image is superposed with the first structured-light image to acquire a superposed structured-light image; and the superposed structured-light image is taken as the first image.

When the set of light source points is selected for the third time and all the light source points in the set of light source points are turned on, after all the light source points in the set of light source points project the structured light, the electronic device controls the image acquirer to capture for the third time to acquire a third structured-light image, and the currently-captured third structured-light image is superposed with the superposed structured-light image acquired after the second capturing are completed to acquire a structured-light image as the first image. That is, in the first image acquired after the third capturing is completed, the first structured-light image, the second structured-light image, and the third structured-light image may be included.

It is performed in this manner until the capturing is finished.

In summary, in this embodiment, except for the structured-light image acquired from the first capturing, the first image acquired from the subsequent capturing may include the structured-light image acquired from this capturing and the structured-light image acquired from each previous capturing.

At block 506, it is determined whether a complete face image is able to be extracted from the first image.

In the embodiment, for the set of light source points turned on for each time, the structured light is projected to the current user through all the light source points in the set of light source points which is currently turned on. After the current capturing is completed and the first image is acquired, it is further determined whether the complete face image can be extracted from the acquired first image.

In detail, at the time of determination, a second image including facial features may be firstly extracted from the first image. The facial features may include eyebrows, eyes, nose, mouth, ears, etc. For example, the second image may be extracted from the first image using related face recognition techniques. The extracted second image is matched with one or more authorized face images stored on the electronic device. The one or more authorized face images may be one or more images, which may be multiple different images of one authorized user, and also be multiple images of multiple different authorized users. The one or more authorized face images may be stored in a memory of the electronic device in advance.

When the extracted second image is matched with the one or more authorized face images, features of facial organs of the current user may be extracted from the second image firstly, and then the extracted features of facial organs are compared with features of facial organs in the one or more authorized face images. When the extracted features of each facial organ are consistent with features of a corresponding facial organ in at least one authorized face image therein, the at least one authorized face image therein is taken as the target authorized face image.

When the target authorized face image is matched from the one or more authorized face images stored in the electronic device, it is determined that the complete face image is extracted from the first image, and then the act at block 508 is performed; when the target authorized face image is not matched from the one or more authorized face images stored in the electronic device, it is determined that the complete face image cannot be extracted from the first image, and the act at block 507 is performed to continue select the set of light source points and capture a new structured-light image.

Further, in one possible implementation of an embodiment of the disclosure, the electronic device may also be unlocked after the target authorized face image is matched when the electronic device is currently in a locked state.

When the second image is matched and recognized with the one or more authorized face images, there are two cases, one is that the second image is incomplete and another is that the second image is complete but not the face image of the authorized user. Therefore, in one possible implementation of the embodiment of the disclosure, after the features of the facial organs are extracted from the second image, it is determined whether the extracted features of the facial organs are complete first. Namely, it is determined whether the features of the facial organs extracted from the second image may completely represent the facial organs of the current use. If the extracted features of the facial organs are not complete, the act at block 507 is performed; if the extracted features of the facial organs are complete, the extracted features of the facial organs are further matched with the features of the facial organs in the one or more authorized face images stored on the electronic device, and after the matching passes, the act at block 508 is performed; and if the matching does not pass, the act at block 509 is performed and capturing is finished, and at the moment, if the electronic device is in a locked state, the locked state is maintained, and if the face payment function of the electronic device is enabled, payment is refused.

At block 507, light source points between boundaries of two adjacent areas from inside to outside are selected sequentially as the set of light source points.

For example, taking FIG. 6 as an example, when the boundary of the next area is determined by taking the interval between two adjacent light source points in the same row as the preset distance, the light source points between the boundary of the area 21 and the boundary of the area 22 may be selected as the set of light source points, and at this time, the set of light source points includes 12 light source points; when the boundary of the next area is determined by taking the interval between adjacent three light source points in the same row as the preset distance, the light source points between the boundary of the area 21 and the boundary of the area 23 may be selected as the set of light source points, and at this time, the set of light source points includes 32 light source points.

After the next set of light source points is selected, execution may return to the act at block 502 to begin from the set of light source points and project the structured light through the light source points in the set of light source points to the current user to enable the image acquirer to acquire a new first image.

It is noted here that after the second time and after each time of selecting the set of light source points for performing the acts at blocks 502 and 503 after the second time, the act at block 505 and its subsequent acts are performed, not the act at block 504.

At block 508, the first image is taken as the target image.

In the embodiment, when the target authorized face image is matched, it is determined that the complete face image is extracted from the first image, and the first image is taken as the target image.

block 509, the structured-light emitter is controlled to stop emitting the structured light.

To further reduce the power consumption of the electronic device, in the present embodiment, the electronic device may control the structured-light emitter to stop emitting the structured light after determining that a complete face image is extracted from the first image.

With the image processing method of the embodiment, the boundary of the next area is determined based on the preset distance interval starting from the boundary of the first area in a mode of extending from the middle to the periphery, and the light source points between the boundaries of two adjacent areas are gradually selected as the set of light source points. In the capturing process, the set of light source points is successively selected and the light source points are turned on to capture. During capturing, the structured-light emitter may be controlled to project a small amount of structured light each time, and project for multiple times, effectively reducing the instantaneous power consumption during capturing, facilitating the heat dissipation, and avoiding the obvious heating phenomenon of the mobile terminal. By superposing images captured each time to acquire the first image, determining whether the complete face image may be extracted from the first image, taking the first image as the target image when the complete face image is extracted, and controlling the structured-light emitter to stop emitting the structured light, the projection quantity of the structured light may be reduced, and the power consumption of the electronic device may be reduced.

Figure 8:
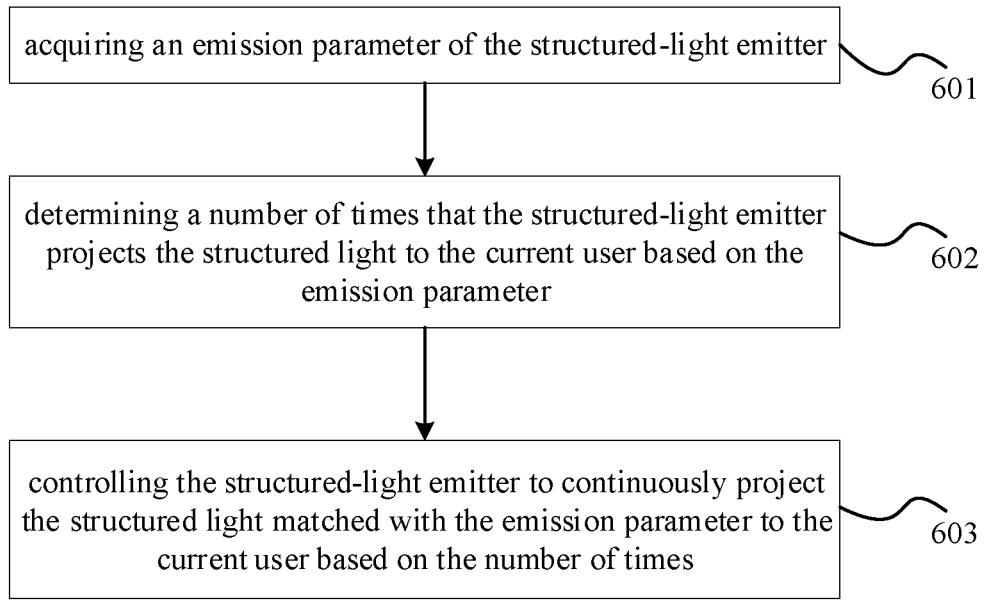
FIG. 8 is a flowchart of an image processing method according to an embodiment of the disclosure.

To more clearly describe the implementation process of controlling the structured-light emitter to project the structured light to the current user based on the preset rule in the previous embodiment, another image processing method is proposed in the embodiment of the disclosure. FIG. 8 is a flowchart of an image processing method proposed in the embodiment of the disclosure.

As illustrated in FIG. 8, on the basis of the embodiment illustrated in FIG. 1, the act at block 101 may include the following.

At block 601, an emission parameter of the structured-light emitter is acquired.

In the embodiment, the mobile terminal acquires the emission parameter of the built-in structured-light emitter before acquiring the image of the current user.

The structured-light emitter is configured to project the structured light to a captured object. A projection set of light beams in a known spatial direction is called as the structured light. In this embodiment, the type of structured light may be any one of a grating type, a spot type, a speckle type (including circular speckle and cross speckle), a non-uniform speckle pattern, etc.

It should be noted that the implementation of acquiring the emission parameter of the structured-light emitter will be given in the following, and will not be described in detail here in order to avoid redundancy.

At block 602, a number of times that the structured-light emitter projects the structured light to the current user is determined based on the emission parameter.

In the embodiment, after the mobile terminal acquires the emission parameter of the structured-light emitter, the number of times that the structured-light emitter projects the structured light to the current user may be further determined based on the emission parameter.

The emission parameter is generally represented by fraction. To simplify the determination process of the number of times of projecting the structured light, the denominator of the emission parameter may be determined as the number of times of projecting the structured light to the current user by the structured-light emitter. For example, if the emission parameter of the structured-light emitter is $1/3$, it may be determined that the structured-light emitter projects the structured light to the current user for three times.

It should be noted here that the determination of the denominator of the emission parameter as the number of times that the structured-light emitter projects the structured light to the current user is by way of example and not as a limitation of the disclosure. In the embodiment of the disclosure, the integer multiple of the denominator of the emission parameter may also be determined as the number of times that the structured-light emitter projects the structured light, for example, the emission parameter is $1/2$, and the number of times that the structured-light emitter projects the structured light may be 2 times, 4 times, 6 times, etc., which is not limited by the disclosure.

At block 603, the emitter is controlled to continuously project the structured light matched with the emission parameter to the current user based on the number of times.

After the number of times that the structured-light emitter projects the structured light to the current user is determined, the mobile terminal may control the structured-light emitter to continuously project the structured light matched with the emission parameter to the current user based on the determined number of times that the structured light is projected.

As an example, assuming that the emission parameter is $1/3$, the number of times that the structured-light emitter projects the structured light is determined based on the emission parameter to be three. The mobile terminal controls the structured-light emitter to continuously project the structured light to the current user for three times, and the quantity of the structured light projected each time is $1/3$ of the total quantity of the structured light.

As another example, assuming that the emission parameter of $1/3$, the number of times that the structured-light emitter projects the structured light is determined based on the emission parameter to be six. The mobile terminal controls the structured-light emitter to continuously project the structured light to the current user for six times, and the quantity of the structured light projected each time is $1/6$ of the total quantity of the structured light.

Furthermore, the image acquirer may be controlled to capture the structured-light image modulated by the current user each time and carry out image superposition to acquire the target image.

With the image processing method of the embodiment, the emission parameter of the structured-light emitter is acquired, the number of times that the structured-light emitter projects the structured light to the current user is determined based on the emission parameter, and the emitter is controlled to continuously project the structured light matched with the emission parameter to the current user based on the determined number of times. Therefore, by means of emitting part of structured light for multiple times, not only the structured light projected each time may not be too much, but also the instantaneous power consumption during capturing may be effectively reduced, the heat dissipation is facilitated, and the obvious heating phenomenon on the mobile terminal is avoided. Moreover, all light source points may be covered through multiple times of projection, making the completed imaging of the captured object, and ensuring the imaging quality.

To more clearly describe the implementation of the above-described embodiments for acquiring the emission parameter of the structured-light emitter, the disclosure provides two possible implementations for acquiring the emission parameter.

Figure 9:
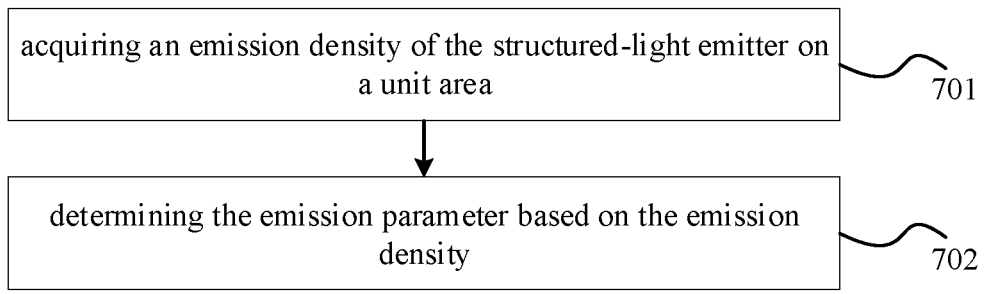
FIG. 9 is a flowchart of a method for acquiring an emission parameter according to an embodiment of the disclosure.

As one possible implementation, the emission parameter of the structured-light emitter may be determined on the basis of an emission density of the structured-light emitter. FIG. 9 is a flowchart of a method for acquiring the emission parameter set forth in an embodiment of the disclosure.

As illustrated in FIG. 9, on the basis of the embodiment illustrated in FIG. 8, the act at block 601 may include the following.

At block 701, an emission density of the structured-light emitter on a unit area is acquired.

In detail, when the emission density of the structured-light emitter is acquired, the area of the light source array in the structured-light emitter may be acquired firstly, the number of infrared light sources on the unit area of the structured-light emitter is acquired based on the acquired area of the light source array and the number of infrared light sources in the light source array, and the acquired number of infrared light sources on the unit area is used as the emission density.

As an example, for the same type of structured-light emitter, the area of the light source array of the structured-light emitter and the number of infrared light sources in the light source array are fixed. The area of the light source array of the structured-light emitter and the number of infrared light sources in the light source array may be stored in the memory of the mobile terminal when the mobile terminal is manufactured. When the emission parameter of the structured-light emitter needs to be acquired, it may be retrieved directly from the memory of the mobile terminal. Furthermore, the number of the infrared light sources is compared with the area of the light source array to take a ratio, and the acquired result is the emission density of the structured-light emitter.

At block 702, the emission parameter is determined based on the emission density.

In this embodiment, after determining the emission density, the emission parameter of the structured-light emitter may be further determined based on the emission density.

In particular, the emission density may be compared with a preset value to take a ratio to acquire the emission parameter.

The preset numerical value may be set by user, and the user may choose to set a fixed numerical value or choose to set a numerical value in advance at each capturing. In general, the preset value is greater than the emission density, so that the emission parameter of the structured-light emitter is fractional. Optionally, the predetermined value is an integer multiple of the emission density.

As an example, a selection switch may be set in the parameter setting options of the camera in the mobile terminal, such as an "emission parameter dynamic adjustment" switch, which is turned on by default. When the user chooses to close the switch, after the user closes the switch, a popup window is displayed in a display interface of the mobile terminal to remind the user to input a certain numerical value as a preset numerical value. Under the condition that the switch is closed, the emission parameter of the structured-light emitter is uniquely determined, and the user does not need to set the preset numerical value in the subsequent capturing process. When the user selects to turn on the switch, when the camera is turned on every time, after the background of the mobile terminal acquires the emission density of the structured-light emitter, a popup window is displayed in a display interface of the mobile terminal so as to remind the user to input a certain numerical value as the preset numerical value. Optionally, in order to avoid that the value input by the user does not meet the requirements and the actual situation, such as when the value input by the user is 0 and the division operation rule is not met, when the user is prompted to input the value, several alternative values may be presented to the user for selecting one of them as the preset value.

With the image processing method of the embodiment, the emission density of the structured-light emitter on the unit area is acquired, and the emission parameter is determined based on the emission density. When the emission parameter is determined, the emission parameter is acquired by taking the ratio of the emission density and the preset numerical value. Different numerical values may be set by the user due to the preset numerical value, so that different emission parameters are acquired, and the times of projecting the structured-light emitter by the structured-light emitter may be flexibly adjusted, improving user experience.

Figure 10:
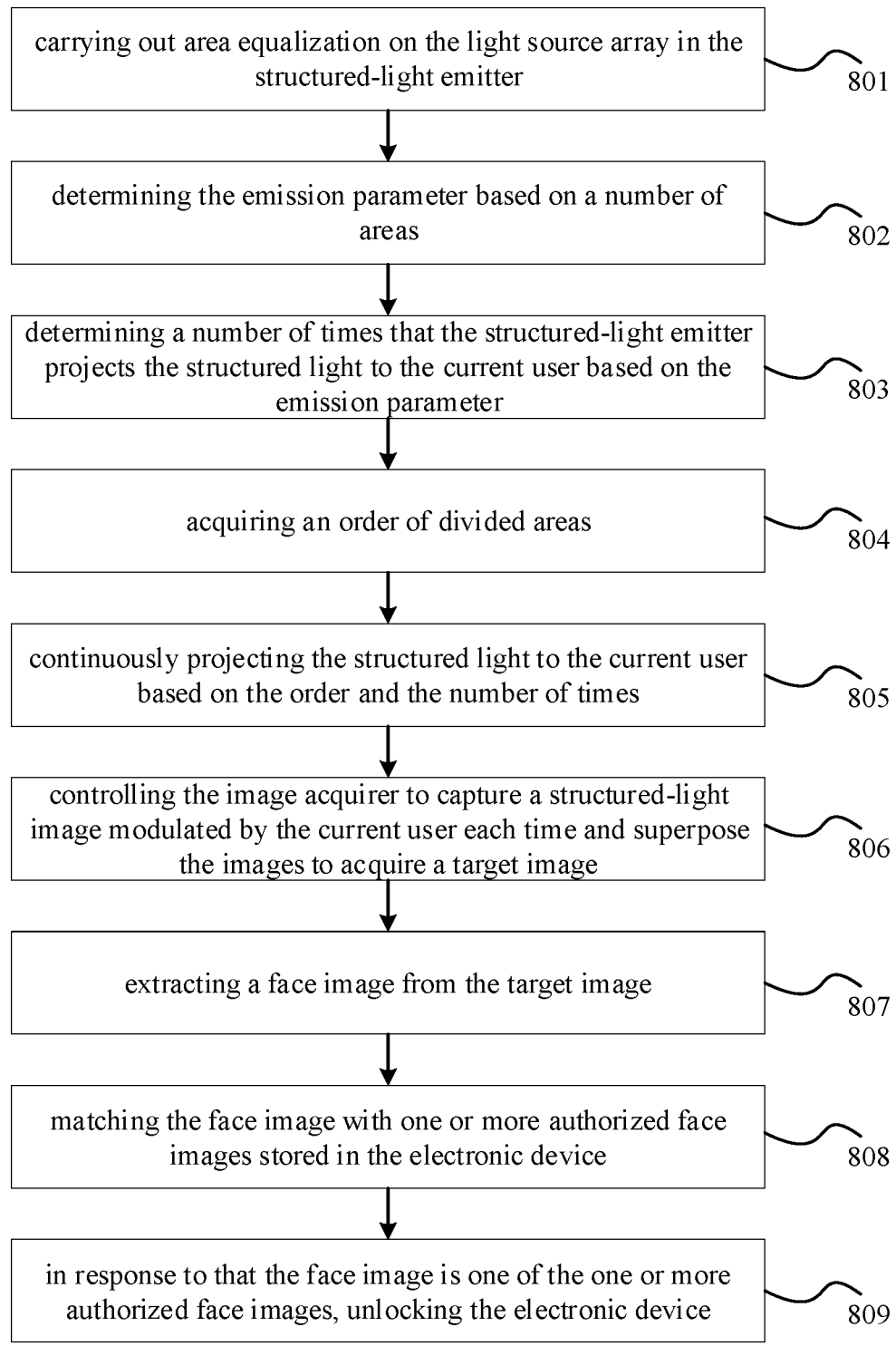
FIG. 10 is a flowchart of an image processing method according to an embodiment of the disclosure.

As another possible implementation, the emission parameter may be determined according to the area division of the light source array of the structured-light emitter, so that the embodiment of the disclosure proposes another image processing method. FIG. 10 is a flowchart of an image processing method proposed by the embodiment of the disclosure.

As illustrated in FIG. 10, the image processing method may include the following.

At block 801, area equalization on the light source array in the structured-light emitter is carried out.

In the embodiment, before image acquisition is carried out, the mobile terminal may firstly carry out area equalization on the light source array of the structured-light emitter, and the light source array is evenly divided into a plurality of areas.

The number of the divided areas may be set to a preset default value by a developer before the mobile terminal leaves a factory, and the number of the divided areas may be set to be adjusted by the user.

As an example, a switch may be set in the parameter setting options of the camera in the mobile terminal, such as a "number of areas setting" switch, which is closed by default. When the switch is in a closed state, the mobile terminal performs area equalization on the light source array of the structured-light emitter based on the default value of the number; when the user turns on the switch, prompting information is displayed in a display interface of the mobile terminal when the camera is turned on every time so as to remind the user to input the number of the areas, and after the number of the areas is set by the user, the mobile terminal evenly divides the area of the light source array in the structured-light emitter based on the number set by the user.

For example, taking the light source array illustrated in FIG. 6 as an example, assuming that the number of areas provided is four, it is possible to divide the first column and the second column into the same area, the third column and the fourth column into the same area, the fifth column and the sixth column into the same area, and the seventh column and the eighth column into the same area in the order from left to right. Alternatively, it is possible to divide the first row and the second row into the same area, the third row and the fourth row into the same area, the fifth row and the sixth row into the same area, and the seventh row and the eighth row into the same area, in the order from top to bottom.

At block 802, the emission parameter is determined based on a number of areas.

As an example, the number of divided areas may be taken as the emission parameter of the structured-light emitter, in which case the emission parameter is a positive integer. For example, if the light source array is evenly divided into four areas, the emission parameter is four.

As another example, the inverse of the number of divided areas may be used as the emission parameter for the structured-light emitter, where the emission parameter is a fraction. For example, if the light source array is evenly divided into five areas, the emission parameter is $\frac{1}{5}$.

At block 803, the number of times that the structured-light emitter projects the structured light to the current user is determined based on the emission parameter.

In this embodiment, after the emission parameter of the structured-light emitter is determined, the number of times that the structured-light emitter projects the structured light to the current user may be further determined based on the emission parameter.

As an example, when the determined emission parameter is a positive integer, an integer multiple of the emission parameter may be taken as the number of times that the structured light is projected. For example, when the emission parameter is 3, the number of times that the structured light is projected may be 3 times, 6 times, 9 times, etc.

As another example, when the determined emission parameter is a fraction, an integer multiple of the denominator of the emission parameter may be taken as the number of times that the structured light is projected. For example, when the emission parameter is $\frac{1}{3}$, the number of times that the structured light is projected may be 3 times, 6 times, 9 times, etc.

At block 804, an order of divided areas is acquired.

Here, the order of the divided areas includes, but is not limited to, from left to right, and/or, from top to bottom.

At block 805, the structured light is projected continuously to the current user based on the order and the number of times.

In this embodiment, the mobile terminal may acquire the order in which the light source array is divided, e.g., from left to right, from top to bottom, from right to left, etc., while performing area equalization on the light source array in the structured-light emitter. Furthermore, the mobile terminal may control the structured-light emitter to continuously project the structured light to the current user based on the acquired order and the times of projecting the structured light.

At block 806, the image acquirer is controlled to capture the structured-light image modulated by the current user each time and superpose the images to acquire the target image.

After the structured-light emitter projects the structured light to the current user every time, the structured light reaches the current user and changes due to the modulation of the current user after reaching the current user. At the moment, the mobile terminal controls the image acquirer to capture the structured-light image modulated by the current user. After the structured-light emitter projects the structured light each time, the image acquirer captures a corresponding structured-light image, and after the last capturing is finished, the acquired structured-light images are superposed to acquire the target image.

As an example, assuming that the number of times that the structured-light emitter projects the structured light is determined based on the emission parameter to be three times, after the structured-light emitter projects $\frac{1}{3}$ of the quantity of structured light to the current user for the first time, the mobile terminal controls the image acquirer to capture for the first time to acquire a first structured-light image; the structured-light emitter projects $\frac{1}{3}$ of the quantity of structured light to the current user for the second time, and the mobile terminal controls the image acquirer to capture for the second time to acquire a second structured-light image; and the structured-light emitter projects the remaining $\frac{1}{3}$ of the quantity of structured light to the current user for the third time, and the mobile terminal controls the image acquirer to capture for the third time to acquire a third structured-light image. Image superposition is then performed on the three acquired structured-light images to acquire the target image.

Further, after the target image is acquired, the face image in the target image may be matched with one or more face images stored in advance in the mobile terminal, and the mobile terminal may be unlocked when the matching passes, or electronic payment and the like may be completed.

At block 807, a face image is extracted from the target image.

In the embodiment, after acquiring the target image, the related face recognition technology may be adopted to extract the face image from the target image.

At block 808, the face image is matched with one or more authorized face images stored in the electronic device.

The one or more authorized face images may be one or more images, multiple different images of one authorized user or multiple images of multiple different authorized users. The authorized face images may be stored in a memory of the electronic device in advance.

At block 809, in response to that the face image is one of the one or more authorized face images, the electronic device is unlocked.

The face image extracted from the target image is matched with the one or more authorized face images stored in the electronic device in advance, and the electronic device is unlocked if the face image is one of the one or more authorized face images.

As an example, when the pre-stored authorized face images are a plurality of different images of one authorized user, expression recognition may be performed on the extracted face image and the stored authorized face images, and images with consistent expressions may be recognized as the same images. When the extracted face image is the same as the expression of one stored authorized face image, the electronic device is unlocked.

As another example, when the authorized face images are a plurality of images of a plurality of different authorized users, and one authorized face image is stored for each authorized user in the electronic device, face recognition may be performed on the extracted face image and the stored authorized face images, and the images with same facial organs may be recognized as the same images. The electronic device is unlocked when the extracted face image is identical to facial organs of one of the stored authorized face images.

As another example, when the authorized face images are a plurality of images of a plurality of different authorized users, and the electronic device stores a plurality of authorized face images with different expressions for each authorized user, the electronic device may be unlocked in a manner of combining face recognition and expression recognition when the facial organs and facial expressions of the extracted face image are the same as the same authorized face image.

With the image processing method of the embodiment, the area of the light source array in the structured-light emitter is evenly divided, the emission parameter is determined based on the number of the areas, the number of times that the structured-light emitter projects the structured light to the current user is determined based on the emission parameter, the order of the divided areas is acquired, and the structured light is continuously projected to the current user based on the order and the number of times; and the image acquirer is controlled to capture the structured-light image modulated by the current user each time and superpose the images to acquire the target image. The structured-light emitter is controlled to project the structured light for multiple times during capturing, such that the structured light projected every time is not too much, effectively reducing the instantaneous power consumption during capturing, and facilitating the heat dissipation. After the target image is acquired, the face image is extracted from the target image, the face image is matched with the authorized face images stored in the electronic device, and the electronic device is unlocked when the matching is successful, realizing the human face unlocking, ensuring the terminal safety, and improving the terminal unlocking convenience.

To realize the embodiments, the disclosure also provides an image processing apparatus.

Figure 11:
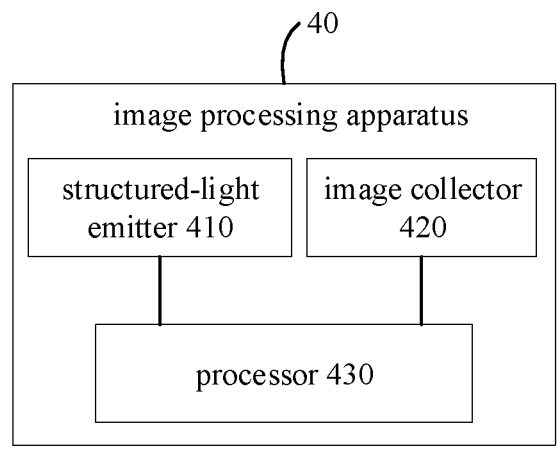
FIG. 11 is a block diagram of an image processing apparatus according to an embodiment of the disclosure.

FIG. 11 is a block diagram of an image processing apparatus according to an embodiment of the disclosure. The image processing apparatus may be applicable to an electronic device. The electronic device may be a mobile terminal such as a mobile phone, a tablet computer.

As illustrated in FIG. 11, the image processing apparatus 40 includes: a structured-light emitter 410, an image acquirer 420, and a processor 430.

The structured-light emitter 410 is configured to emit structured light to a current user.

The image acquirer 420 is configured to capture a structured-light image modulated by the current user.

The processor 430 is configured to: control the structured-light emitter to project the structured light to the current user based on a preset rule; and control the image acquirer 420 to capture the structured-light image modulated by the current user each time and superpose the images to acquire a target image.

In one possible implementation of an embodiment of the disclosure, the processor 430 controls the structured-light emitter to project the structured light to the current user based on the preset rule, by: turning on light source points in the structured-light emitter by row or column; projecting the structured light to the current user through the light source points which are currently turned on, and turning off the light source points which are currently turned on after the structured light is projected.

In detail, when the processor 430 turns on the light source points in the structured-light emitter 410, each row of light source points in the structured-light emitter 410 may be turned on row by row starting from the first row; or each column of light source points in the structured-light emitter 410 may be turned on column by column starting from the first column; or each row of light source points in the structured-light emitter 410 may alternately be turned on from a designated row to two sides of the designated row; alternatively, each column of light source points in the structured-light emitter 410 may be alternately turned on from a designated column to both sides of the designated column.

In one possible implementation of an embodiment of the disclosure, the processor 430 controls the structured-light emitter to project the structured light to the current user based on the preset rule, by: successively selecting a set of light source points from a light source array in the structured-light emitter based on a direction extending from a first area to a periphery of the first area; the first area being located at a central position of the light source array; turning on the set of light source points; projecting the structured light to the current user through the set of light source points, and turning off the set of light source points after the structured light is projected.

In detail, when the processor 430 selects the set of light source points, light source point in the first area may be selected as the set of light source points; after the set of light source points corresponding to the first area projects the structured light, a boundary of a next area is determined, along a direction extending from the first area to the periphery of the first area, starting from a boundary of the first area based on a preset distance interval; and light source points between boundaries of two adjacent areas from inside to outside are sequentially selected as the set of light source points.

The processor 430 controls the image acquirer 420 to capture the structured-light image modulated by the current user each time and superpose the images to acquire the target image, by: starting from a structured-light image captured for a first time, superposing a structured-light image captured currently and a structured-light image acquired last time to acquire a first image; determining whether a complete face image is able to be extracted from the first image; and in response to that the complete face image is able to be extracted, taking the first image as the target image. Further, after acquiring the target image, the structured-light emitter 410 may be controlled to stop emitting the structured light.

In detail, the process by which the processor 430 determines whether the complete face image is able to be extracted from the first image is: extracting a second image including facial features from the first image; matching the second image with one or more authorized face images stored on the electronic device; and in response to that the second image is matched with the authorized face image, determining that the complete face image is able to be extracted from the first image.

Further, when the processor 430 matches the second image with the one or more authorized face images stored on the electronic device, features of facial organs may be extracted from the second image; the extracted features of facial organs is compared with features of facial organs in the one or more authorized face images; and in response to that the extracted features of each facial organ are consistent with features of a corresponding facial organ in one of the one or more authorized face images, the one of the one or more authorized face images is taken as the target authorized face image.

Further, when the electronic device is currently in a locked state, after the authorized face image is matched, the electronic device is unlocked.

In one possible implementation of an embodiment of the disclosure, the processor 430 controls the structured-light emitter to project the structured light to the current user based on the preset rule, by: acquiring an emission parameter of the structured-light emitter; determining a number of times that the structured-light emitter projects the structured light to the current user based on the emission parameter; and controlling the structured-light emitter to continuously project the structured light matched with the emission parameter to the current user based on the number of times.

As one possible implementation, the processor 430 acquires the emission parameter of the structured-light emitter, by: acquiring an emission density of the structured-light emitter on a unit area; and determining the emission parameter based on the emission density.

In detail, when the processor 430 acquires the emission density of the structured-light emitter per unit area, an area of a light source array in the structured-light emitter may be acquired; a number of infrared light sources on the unit area of the structured-light emitter may be acquired based on the area and a number of infrared light sources in the light source array; the number of the infrared light sources per unit area is taken as the emission density.

Further, processor 430 may ratio the emission density to a predetermined value to acquire the emission parameter.

As one possible implementation, the processor 430 acquires the emission parameter of the structured-light emitter, by: carrying out area equalization on the light source array in the structured-light emitter; and determining the emission parameter based on a number of areas. Therefore, in the embodiment, when the processor 430 controls the emitter to continuously project the structured light matched with the emission parameter to the current user based on the times, the order of the divided areas may be acquired; the structured light is continuously projected to the current user based on the order and times.

Further, in one possible implementation of an embodiment of the disclosure, after the processor 430 acquires the target image, a face image may be extracted from the target image; the face image is matched with one or more authorized face images stored in the electronic device; and in response to that the face image is one of the one or more authorized face images, the electronic device is unlocked.

It should be noted that the foregoing explanation of the embodiment of the image processing method is also applicable to the image processing apparatus of this embodiment, and the implementation principles thereof are similar and will not be described in detail herein.

With the image processing apparatus of the embodiment of the disclosure, the structured-light emitter is controlled to project the structured light to the current user based on the preset rule, and the image acquirer is controlled to capture the structured-light image modulated by the current user each time and superpose the images to acquire the target image. Therefore, the structured-light emitter is controlled to project a small amount of structured light each time based on the set rule during capturing, effectively reducing the instantaneous power consumption during capturing, facilitating heat dissipation, avoiding the obvious heating phenomenon on the mobile terminal, and solving the technical problem that the instantaneous power consumption of the mobile terminal is large because all light source points are turned on to project the structured light in the related art. Furthermore, all light source points may be covered through multiple times of projection, making the imaging of the captured object complete, and ensuing the imaging quality.

To realize the embodiment, the disclosure also provides an electronic device.

Figure 12:
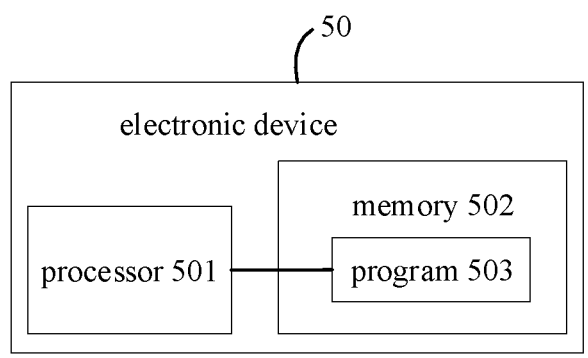
FIG. 12 is a block diagram of an electronic device according to an embodiment of the disclosure.

FIG. 12 is a schematic diagram of an electronic device according to an embodiment of the disclosure. As illustrated in FIG. 12, the electronic device 50 includes: one or more processors 501, a memory 502, and one or more programs 503. The one or more programs 503 are stored in the memory 502 and configured to be executed by the one or more processors 501. The one or more programs 503 include instructions for performing the image processing method described in any of the preceding embodiments.

Figure 13:
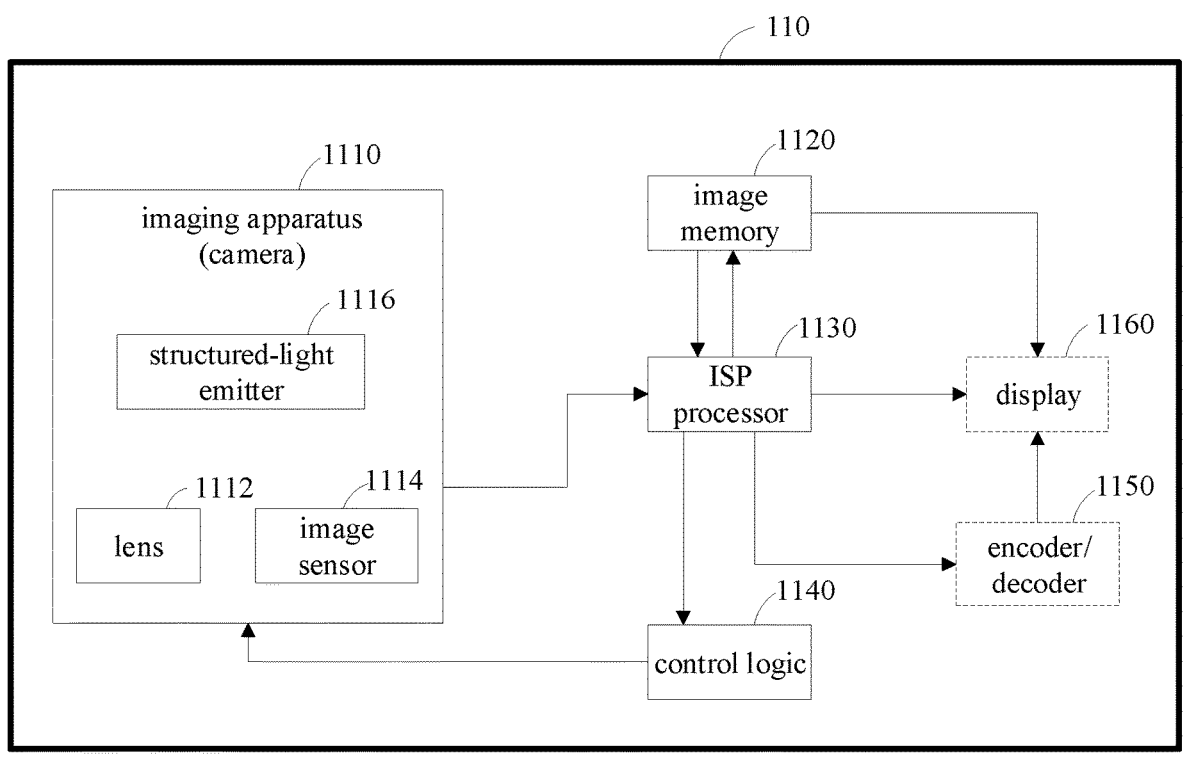
FIG. 13 is a schematic diagram of an image processing circuitry in a terminal according to an embodiment of the disclosure.

Embodiments of the disclosure also provide a terminal that includes an image processing circuitry. The image processing circuitry may be implemented using hardware and/or software components. The image processing circuitry may include various processing units that define ISP (Image Signal Processing) pipelines. FIG. 13 is a schematic diagram of an image processing circuitry in a terminal according to an embodiment of the disclosure. For ease of illustration, as illustrated in FIG. 13, various aspects of the image processing techniques associated with embodiments of the disclosure are illustrated.

As illustrated in FIG. 13, the image processing circuitry 110 includes an imaging apparatus 1110, an ISP processor 1130, and a control logic 1140. The imaging apparatus 1110 may include a camera having one or more lenses 1112 and one or more image sensors 1114, and a structured-light emitter 1116. The structured-light emitter 1116 projects structured light onto the object under test. The structured light pattern therein may be laser stripes, a Gray code, sinusoidal stripes, or a randomly-arranged speckle pattern. The image sensor 1114 captures a structured-light image formed on the object under test when the structured light is projected onto the object under test and transmits the structured-light image to the ISP processor 1130. The ISP processor 1130 superimposes the structured-light images to acquire a target image. Meanwhile, the image sensor 1114 may also capture color information of the object under test. Of course, the structured-light image and color information of the object under test may also be captured by the two image sensors 1114, respectively.

After the ISP processor 1130 receives the color information of the object under test captured by the image sensor 1114, image data corresponding to the color information of the subject may be processed. The ISP processor 1130 analyzes the image data to acquire image statistics information that may be used to determine one or more control parameters of the imaging apparatus 1110. The image sensor 1114 may include an array of color filters (e.g., Bayer filters). The image sensor 1114 may acquire light intensity and wavelength information captured with each imaging pixel of the image sensor 1114 and provide a set of original image data that may be processed by ISP processor 1130.

The ISP processor 1130 processes the original image data pixel by pixel in a variety of formats. For example, each image pixel may have a bit depth of 8, 10, 12, or 14 bits, and the ISP processor 1130 may perform one or more image processing operations on the original image data to collect image statistics information about the image data. The image processing operations may be performed with the same or different bit depth accuracy.

The ISP processor 1130 may also receive pixel data from the image memory 1120. The image memory 1120 may be a part of a memory device, a memory device, or a separate dedicated memory within an electronic device, and may include DMA (Direct Memory Access) features.

The ISP processor 1130 may perform one or more image processing operations when original image data is received.

The image data of the target image may be sent to the image memory 1120 for additional processing prior to being displayed. The ISP processor 1130 receives the processed data from the image memory 1120 and processes the processed data in the original domain and in the RGB and YCbCr color spaces. The image data of the three-dimensional image may be output to a display 1160 for viewing by a user and/or further being processed by a graphics engine or GPU (Graphics Processing Unit). In addition, the output of the ISP processor 1130 may also be sent to the image memory 1120, and the display 1160 may read image data from the image memory 1120. In one embodiment, the image memory 1120 may be configured to implement one or more frame buffers. In addition, the output of the ISP processor 1130 may be sent to an encoder/decoder 1150 to encode/decode the image data. The encoded image data may be saved and decompressed prior to display on the display 1160 device. The encoder/decoder 1150 may be implemented by a CPU or GPU or co-processor.

The image statistics information determined by the ISP processor 1130 may be sent to the control logic 1140. The control logic 1140 may include a processor and/or microcontroller that executes one or more routines (e.g., firmware) that may determine control parameters for the imaging apparatus 1110 on the basis of received image statistics information.

The image processing method described above may be implemented using the image processing technique of FIG. 13.

In order to implement the above-described embodiments, the disclosure also proposes a computer-readable storage medium including computer programs for use in conjunction with the electronic device 50 capable of capturing. The computer programs may be executable by the processor 501 to perform the image processing method as described in any of the preceding embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In the present specification, schematic representations of the above terms are not necessarily directed to the same embodiments or examples. Furthermore, the particular feature, structure, material, or characteristic described may be combined in any one or more embodiments or examples in a suitable manner. Moreover, various embodiments or examples described in this specification, as well as features of various embodiments or examples, may be integrated and combined by those skilled in the art without conflict.

Furthermore, terms "first" and "second" are only used for descriptive purposes and cannot be seen as indicating or implying relative importance or implicitly indicating the number of technical features indicated. Thus, feature defined with "first" and "second" may explicitly or implicitly include at least one such feature. In the description of the disclosure, "a plurality of" means at least two, e.g., two, three, unless specifically defined otherwise.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which may not be in the order illustrated or discussed. Including performing functions in a substantially simultaneous manner or in a reverse order according to the functions involved should be understood by those skilled in the art to which the embodiments of the disclosure pertain.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above example method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although embodiments of the disclosure have been illustrated and described above, it is to be understood that the above-described embodiments are illustrative and not restrictive, and that changes, modifications, substitutions and variations of the above-described embodiments may be affected within the scope of the disclosure by those of ordinary skill in the art.

What is claimed is:

1. A method of image processing for an electronic device, comprising:
    projecting structured light to a current user based on a preset rule;
    capturing structured-light images modulated by the current user over a period of time; and
    superposing the structured-light images to acquire a target image, wherein capturing the structured-light images modulated by the current user over the period of time and superposing the images to acquire the target image comprises:
- starting from a structured-light image captured for a first time, superposing a structured-light image captured currently and a structured-light image acquired previously to acquire a first image;
- determining whether a complete face image is able to be extracted from the first image; and
- in response to that the complete face image is able to be extracted, taking the first image as the target image, wherein determining whether the complete face image is able to be extracted from the first image comprises:
- extracting a second image including facial features from the first image;
- matching the second image with one or more authorized face images stored on the electronic device; and
- in response to the second image matching the one of more authorized face images, determining that the complete face image is able to be extracted from the first image.

2. The method of claim 1, wherein projecting the structured light to the current user based on the preset rule comprises:
- turning on light source points in a structured-light emitter by row or column;
- projecting the structured light to the current user through the light source points which are currently turned on; and
- turning off the light source points which are currently turned on after the structured light is projected.

3. The method of claim 2, wherein turning on the light source points in the structured-light emitter by row or column comprises:
- starting from a first row or a last row, turning on each row of light source points in the structured-light emitter row by row; or
- starting from a first column or a last column, turning on each column of light source points in the structured-light emitter column by column.

4. The method of claim 2, wherein turning on the light source points in the structured-light emitter by row or column comprises:
- starting from a designated row to two sides of the designated row, alternately turning on each row of light source points in the structured-light emitter; or
- starting from a designated column to two sides of the designated column, alternately turning on each column of light source points in the structured-light emitter.

5. The method of claim 1, wherein projecting the structured light to the current user based on the preset rule comprises:
- successively selecting a set of light source points from a light source array in a structured-light emitter based on a direction extending from a first area to a periphery of the first area; the first area being located at a central position of the light source array;
- turning on the set of light source points;
- projecting the structured light to the current user through the set of light source points; and
- turning off the set of light source points after the structured light is projected.

6. The method of claim 5, wherein successively selecting the set of light source points from the light source array in the structured-light emitter based on the direction extending from the first area to the periphery of the first area comprises:
- selecting light source points in the first area as the set of light source points;
- after the set of light source points corresponding to the first area projects the structured light, determining a boundary of a next area, along a direction extending from the first area to the periphery of the first area, starting from a boundary of the first area based on a preset distance interval; and
- sequentially selecting light source points between boundaries of two adjacent areas from inside to outside as the set of light source points.

7. The method of claim 1, wherein matching the second image with the one or more authorized face images stored on the electronic device comprises:
- extracting features of facial organs from the second image;
- comparing the extracted features of facial organs with features of facial organs in the one or more authorized face images; and
- in response to that the extracted features of each facial organ are consistent with features of a corresponding facial organ in one of the one or more authorized face images, taking the one of the one or more authorized face images as the target authorized face image.

8. The method of claim 1, further comprising:
- in case that the electronic device is currently in a locked state, unlocking the electronic device after the authorized face image is matched.

9. The method of claim 1, further comprising:
- stopping emitting the structured light after taking the first image as the target image in response to that the complete face image is extracted.

10. The method of claim 1, wherein projecting the structured light to the current user based on the preset rule comprises:
- acquiring an emission parameter of a structured-light emitter;
- determining a number of times that the structured-light emitter projects the structured light to the current user based on the emission parameter; and
- continuously projecting the structured light matched with the emission parameter to the current user based on the number of times.

11. The method of claim 10, wherein acquiring the emission parameter of the structured-light emitter comprises:
- acquiring an emission density of the structured-light emitter on a unit area; and
- determining the emission parameter based on the emission density.

12. The method of claim 11, wherein acquiring the emission density of the structured-light emitter on the unit area comprises:
- acquiring an area of a light source array in the structured-light emitter;
- acquiring a number of infrared light sources on the unit area of the structured-light emitter based on the area and a number of infrared light sources in the light source array; and
- taking the number of the infrared light sources on the unit area as the emission density.

13. The method of claim 11, wherein determining the emission parameter based on the emission density comprises:

taking a ratio of the emission density to a preset numerical value to acquire the emission parameter.

14. The method of claim 12, wherein acquiring the emission parameter of the structured-light emitter comprises:
carrying out area equalization on the light source array in the structured-light emitter to acquire divided areas; and
determining the emission parameter based on a number of the divided areas.

15. The method of claim 14, wherein continuously projecting the structured light matched with the emission parameter to the current user based on the number of times includes:
acquiring an order of the divided areas; and
continuously projecting the structured light to the current user based on the order and the number of times.

16. The method of claim 10, after acquiring the target image, further comprising:
extracting a face image from the target image;
matching the face image with one or more authorized face images stored in the electronic device; and
in response to the face image matching the one of the one or more authorized face images, unlocking the electronic device.

17. An image processing apparatus, comprising:
a structured-light emitter, configured to emit structured light to a current user;
an image collector, configured to capture structured-light images modulated by the current user; and
a processor, configured to:
control the structured-light emitter to project the structured light to the current user based on a preset rule;
control the image collector to capture the structured-light images modulated by the current user over a period of time and superpose the structured-light images to acquire a target image; and
capture the structured-light images modulated by the current user over the period of time and superpose the images to acquire the target image by:
starting from a structured-light image captured for a first time, superposing a structured-light image captured currently and a structured-light image acquired previously to acquire a first image;
determining whether a complete face image is able to be extracted from the first image; and
in response to that the complete face image is able to be extracted, taking the first image as the target image;
wherein determining whether the complete face image is able to be extracted from the first image comprises:
extracting a second image including facial features from the first image;
matching the second image with one or more authorized face images stored on the electronic device; and
in response to the second image matching the one of more authorized face images, determining that the complete face image is able to be extracted from the first image.

18. An electronic device comprising:
one or more processors;
a memory; and
one or more programs, wherein the one or more programs are stored in the memory and configured to be executed by the one or more processors, the one or more programs including instructions for executing an image processing method comprising:
projecting structured light to a current user based on a preset rule;
capturing structured-light images modulated by the current user over a period of time; and
superposing the structured-light images to acquire a target image,
wherein capturing the structured-light images modulated by the current user over the period of time and superposing the images to acquire the target image comprises:
starting from a structured-light image captured for a first time, superposing a structured-light image captured currently and a structured-light image acquired previously to acquire a first image;
determining whether a complete face image is able to be extracted from the first image; and
in response to that the complete face image is able to be extracted, taking the first image as the target image,
wherein determining whether the complete face image is able to be extracted from the first image comprises:
extracting a second image including facial features from the first image;
matching the second image with one or more authorized face images stored on the electronic device; and
in response to the second image matching the one of more authorized face images, determining that the complete face image is able to be extracted from the first image.

* * * * *